US007043281B2

United States Patent
Huang et al.

(10) Patent No.: US 7,043,281 B2
(45) Date of Patent: May 9, 2006

(54) PORTABLE ELECTRONIC APPARATUS AND DETACHABLE INPUT DEVICE THEREOF

(75) Inventors: Mao-Sung Huang, Taoyuan (TW); Shih-Chieh Lin, Shinjuang (TW)

(73) Assignee: Darfon Electronics Corp., Taoyuan (TW)

( * ) Notice: Subject to any disclaimer, the term of this patent is extended or adjusted under 35 U.S.C. 154(b) by 532 days.

(21) Appl. No.: 10/213,695

(22) Filed: Aug. 6, 2002

(65) Prior Publication Data

US 2003/0032395 A1 Feb. 13, 2003

(30) Foreign Application Priority Data

Aug. 7, 2001 (TW) .............................. 90119241 A

(51) Int. Cl.
*H04M 1/00* (2006.01)
(52) U.S. Cl. ............... 455/575.1; 455/90.3; 455/556.1; 455/557
(58) Field of Classification Search ............... 455/90.2, 455/90.3, 575.1, 575.3, 575.4, 566, 556–559, 455/348, 347, 344, 349; 24/573.09, 689; 439/350, 352, 357; 379/445, 428.05, 447
See application file for complete search history.

(56) References Cited

U.S. PATENT DOCUMENTS

| 5,488,392 | A | * | 1/1996 | Harris .......................... 345/157 |
| 5,582,105 | A | * | 12/1996 | Miki et al. ................. 101/128.4 |
| 5,643,003 | A | * | 7/1997 | Myer et al. ................... 439/352 |
| 5,815,732 | A | * | 9/1998 | Cooper et al. ................. 710/36 |
| 6,045,388 | A | * | 4/2000 | Higgins et al. .............. 439/352 |
| 2002/0094709 | A1 | * | 7/2002 | Sheldon et al. ............... 439/92 |
| 2003/0008678 | A1 | * | 1/2003 | Lin ............................ 455/556 |

FOREIGN PATENT DOCUMENTS

| TW | 85209986 | 7/1996 |
| TW | 86206980 | 5/1997 |

* cited by examiner

*Primary Examiner*—Edan Orgad
(74) *Attorney, Agent, or Firm*—Snell & Wilmer L.L.P.

(57) ABSTRACT

The present invention provides a detachable data input device for use with a portable electronic apparatus. The data input device such as a keyboard includes a connecting device, a housing, and an adjustment unit. The connecting device includes at least one projection and a first slot. The housing has a second slot and an angle is formed between the extending directions of the first slot and the second slot. The adjustment unit is movable between a first end and a second end of the second slot and is pivotally connected to the connecting device by passing through the first slot and the second slot. When the adjustment unit moves to the first end, the projection extends out of the housing by a first length. When the adjustment unit moves to the second end, the projection extends out of the housing by a second length. The first length is different from the second length.

9 Claims, 6 Drawing Sheets

PORTABLE ELECTRONIC APPARATUS AND DETACHABLE INPUT DEVICE THEREOF

This application claims priority of Taiwan Patent Application Ser. No. 090119241 filed on Aug. 7, 2001.

FIELD OF INVENTION

The present invention generally relates to a portable data input apparatus, and more particularly to a detachable data input apparatus for use with a portable electronic device.

BACKGROUND OF THE INVENTION

Since the birth of notebook computers, many types of small-sized computers have been produced. A common problem associated with the smaller size, however, is that miniaturized input/output devices (such as keyboards) can be cumbersome, slow and uncomfortable to use.

The personal digital assist (PDA), which is typically smaller than a notebook computer, has become very popular in recent years. PDAs typically include a liquid crystal display (LCD) for receiving input and displaying information to the user. Unlike the conventional desktop computer, a PDA does not typically have a conventional keyboard, and has only limited control buttons thereon and a stylus that can be used to input data on the display. The PDA may store handwriting in bitmap or another graphical form, but this technique is typically cumbersome to process, requires a large amount of memory and lowers the efficiency of the PDA. Another method for inputting data to a PDA involves handwriting recognition software installed in the PDA. The PDA encoder translates handwriting to ASCII or another alphanumeric code, and then stores the alphanumeric data. Alternatively, the PDA may have a virtual keyboard. When the virtual keyboard is displayed on the screen, a user can utilize the stylus or control buttons to activate keys within the virtual keyboard to input data.

Conventional input methods for PDAs, however, are not typically as efficient as using a conventional computer keyboard. A typical PDA does not include a conventional keyboard because of relatively large size of the keyboard. Various forms of externally-connectable keyboards have been fashioned to work with PDAs, however. When a user wants to input data, the user connects the separable keyboard to the PDA for rapid data entry.

There are at least two types of the conventional separable keyboards for PDAs. One type is similar to the conventional computer keyboard, but smaller in size. The other is a foldable keyboard whereby a keyboard is separated into at least two parts that are foldably connected to each other. When the foldable keyboard is not in use, it can be folded and conveniently stored.

Miniature external keyboards for portable electronic devices are generally smaller than conventional desktop keyboards to improve portability. The external keyboard is typically connected to the PDA so that the user can hold the keyboard in his/her hands and input data with his/her thumbs. The connection between the external keyboard and the PDA is typically highly determinative of the user's comfort during data input. If the connection is weak, then extra care in handling may be required to prevent the keyboard from detaching from the PDA.

Moreover, the connection mechanism of the PDA and the keyboard has not adjustable, meaning that any particular keyboard design is useable with only a specific PDA design. As many brands and models of PDA become increasingly available, it is a desire to provide a data input apparatus that is able to detachably connect to multiple brands and models of PDAs in a reliable manner.

SUMMARY OF THE INVENTION

Various embodiments of the present invention include a portable electronic apparatus with an external data input device to increase the data input rate. Further aspects of the present invention include a data input apparatus with a connecting device for detachably connecting to a portable data processing device.

Still further, a connecting device provided with an adjustment function may be provided. The connecting device may be further configured to connect with electronic devices from different manufacturers, or having varying designs. By adjusting the length of a projection extending out of the housing of the data input apparatus, the projection of the connecting device may be engaged with the receiving portion of the electronic device to join the keyboard to devices of various size.

In one exemplary embodiment, a portable electronic apparatus includes a data processing device and a data input device. The data input device is detachably connected to the data processing device for inputting data to the data processing device. The data input device suitably includes a housing, a connecting device, and an adjustment unit. The connecting device includes at least one projection and a first slot. The housing has a second slot and an angle is formed between the extending directions of the first slot and the second slot. The adjustment unit is movable between a first end and a second end of the housing and is pivotally connected to the connecting device by passing through the first slot and the second slot. When the adjustment unit moves to the first end, the projection extends out of the housing by a first length. When the adjustment unit moves to the second end, the projection extends out of the housing by a second length. Furthermore, the data processing device has a receiving portion for engaging with the projection. Therefore, the data input device is connected to the data processing device.

In one embodiment of the present invention, the data processing device is a personal digital assistant (PDA). The data input device is a portable keyboard.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1b is an explosive view of the exemplary portable electronic apparatus of FIG. 1a;

DETAILED DESCRIPTION

In accordance with the present invention, a portable data input device is provided. The portable data input device, which may be an external keyboard, keypad, rotary knob or other input device, includes a connecting device configured to detachably connect the input device to a data processing device such as a personal digital assistant (PDA), global positioning system (GPS), cellular phone, portable computer or other device. In one embodiment, the connecting device may be provided with an adjustment feature to selectively connect the portable input device to various models of data processing devices by adjusting the length of a projection extending out of the housing.

Figure 1A:
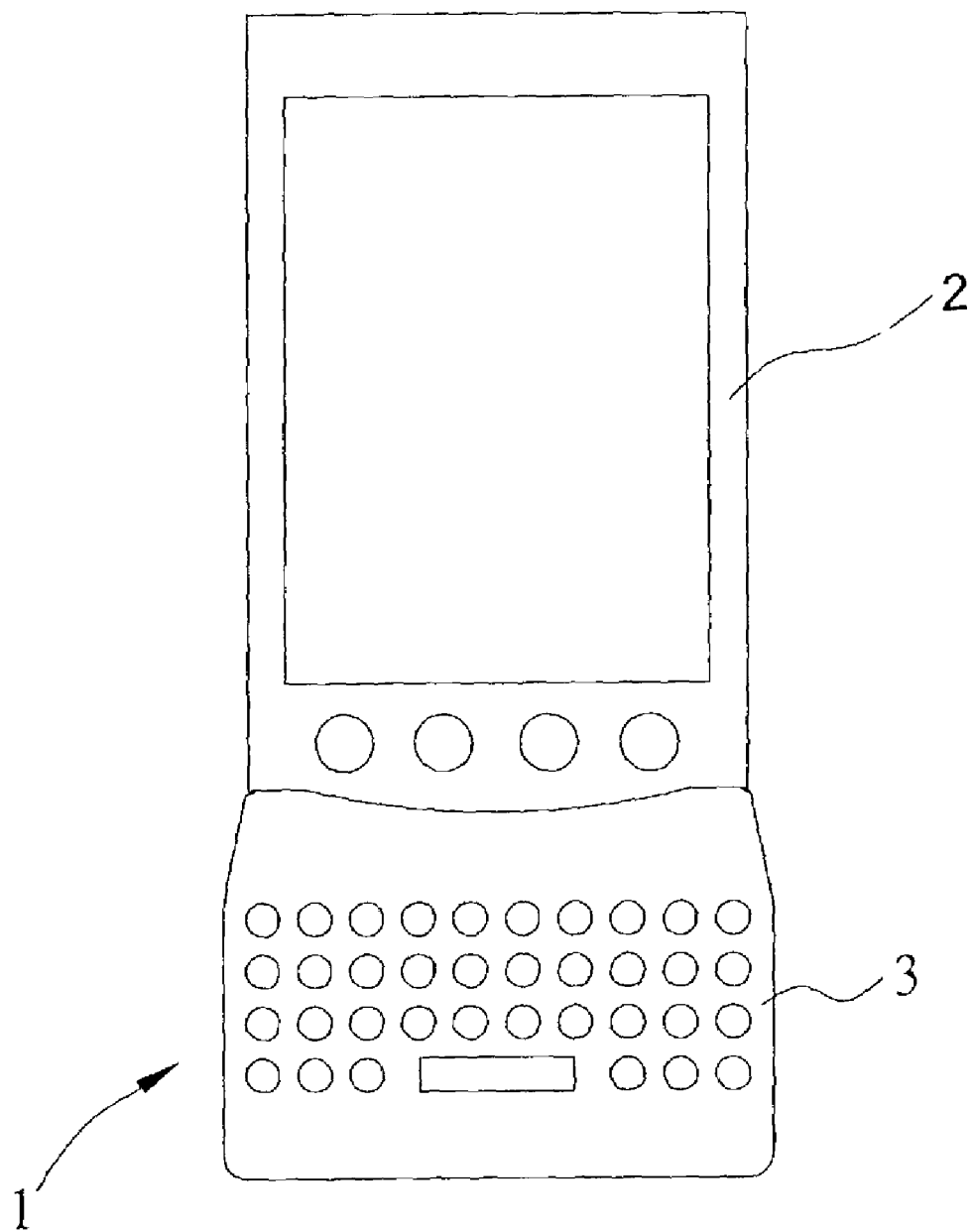
FIG. 1a illustrates an exemplary portable electronic apparatus in one embodiment of the present invention.

Referring now to FIG. 1a, a portable electronic apparatus 1 in one embodiment of the present invention suitably includes a data processing device 2 (shown in the Figure as a PDA) and an input device 3 (shown in the figure as a keyboard). The keyboard 3 may be detachably connected to the personal digital assistant 2 for inputting data to the personal digital assistant 2, as described more fully below.

Figure 1B:
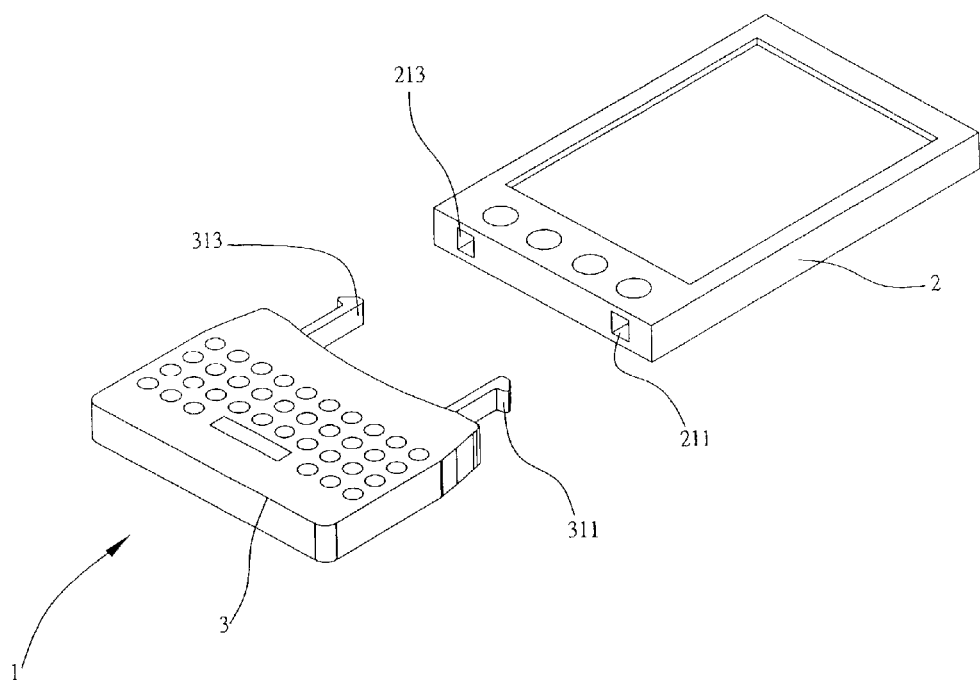

Referring to FIG. 1b, which is an explosive view of an exemplary portable electronic apparatus 1, a personal digital assistant 2 suitably includes a receiving portion such as a slot 211 and a groove 213, in the bottom side. Keyboard 3 suitably includes projections 311 and 313, which may be hook-like extensions or extensions of any other shape or form to mate with the receiving portion of PDA 2. The receiving portion 211 and 213 may be engaged with projections 311 and 313, as appropriate, to connect keyboard 3 to PDA 2. Keyboard 3 is thereby detachably connected to portable computing device 2 by selectively retaining projections 311 and 313 in receiving portions 211 and 213, and by releasing projections 311 and 313 from receiving portion 211 and 213 to release keyboard 3 as appropriate.

Figure 2:
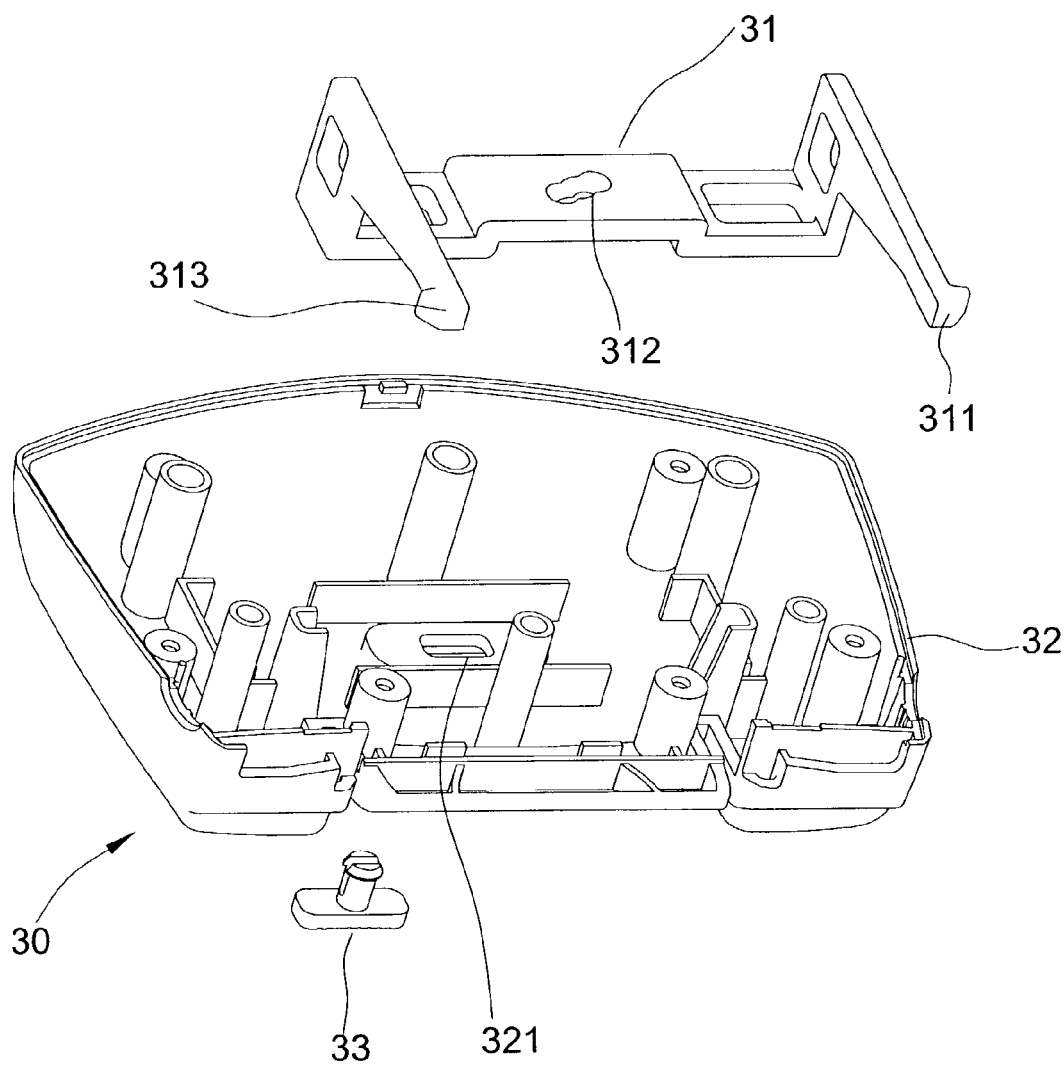
FIG. 2 is an exploded view of an exemplary data input device in one embodiment of the present invention.

Referring to FIG. 2, keyboard 3 suitably includes an input unit (such as a keypad or keyboard, not shown in FIG. 2), a connecting device 31, a housing 32, and an adjustment unit 33. The connecting device 31 may be selectively affixed on a first location and/or a second location of the housing 32, as described below in additional detail.

Figure 3A:
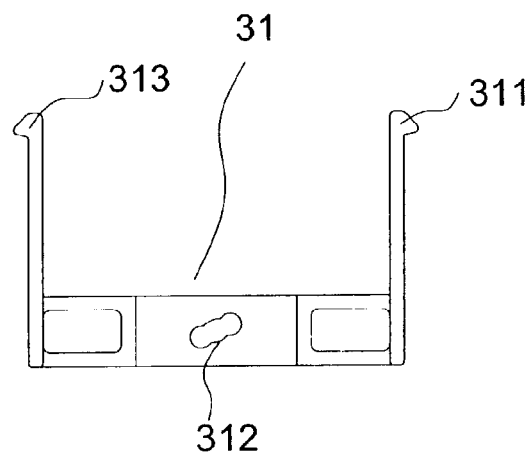
FIG. 3a illustrates an exemplary connecting device in one embodiment of the present invention.

With reference now to FIG. 3a, connecting device 31 suitably includes a first slot 312 and hook-like projections 311 and 313. The first slot 312 is shown in the Figure as an inclination slot (relative to a horizontal line) with a curved inner rim that may be used to orient adjustment unit 33. Projections 311 and 313 are respectively engaged with the receiving portion 211 and 213 to detachably connect keyboard 3 to PDA device 2.

Figure 3B:
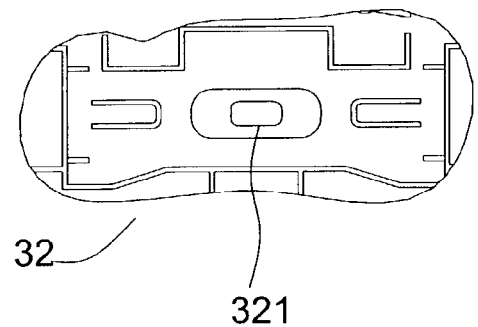
FIG. 3b illustrates an exemplary housing in one embodiment of the present invention.

With reference to FIG. 3b, housing 32 suitably includes a second slot 321. The second slot 321 is shown to be a substantially horizontal slot in the Figure. Accordingly, an angle is formed between the extending directions of the second slot 321 and the first slot 312, as shown in FIGS. 4 and 5.

Figure 3C:
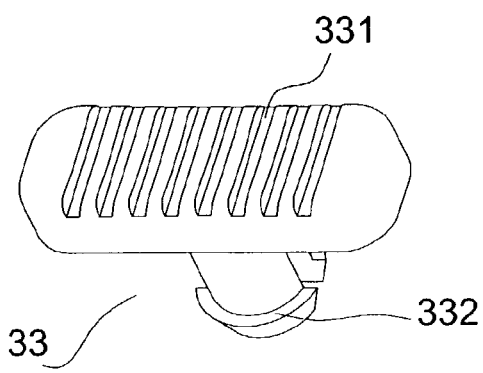
FIG. 3c illustrates an exemplary adjustment unit in one embodiment of the present invention.

Referring to FIG. 3c, adjustment unit 33, which may be configured as button-like or slide-like, has a driving portion 331 and a raised portion 332. Adjustment unit 33 is suitably pivotally connected to connecting device 31 by passing through second slot 321 and first slot 312. Adjustment unit 33 may be further movable in first slot 312 and second slot 321, as shown in FIGS. 4 and 5, as a user exerts a force on the driving portion 331 to adjust the location of the raised portion 332. The driving portion 331 has an appropriately rough surface (e.g. any number of elevated bumps, circles, shapes or lines) to increase friction when user exerts a force.

Figure 4:
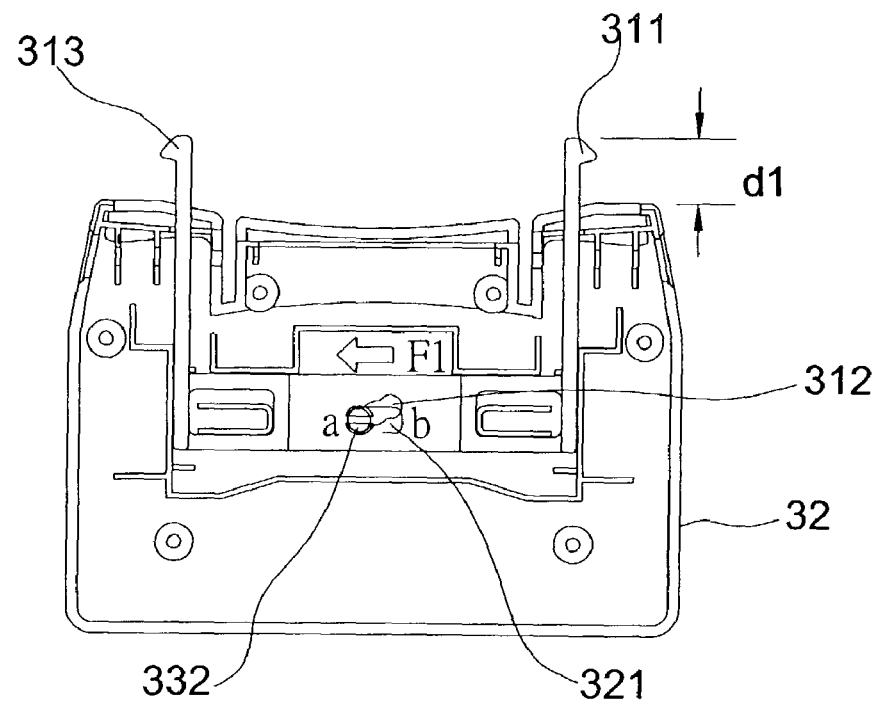
FIG. 4 illustrates a schematic view of an exemplary connecting device when the adjustment unit is at the first end.
Figure 4:
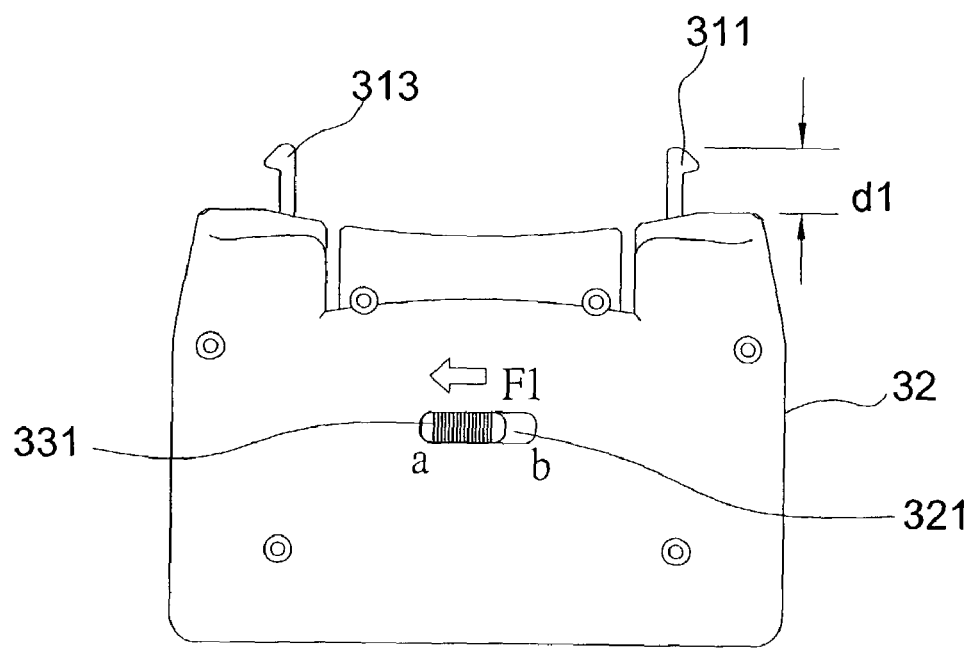

Referring to FIG. 4, raised portion 332 of adjustment unit 33 may be pivotally connected to connecting device 31 by passing through second slot 321 and first slot 312 such that an angle is formed between the extending directions of first slot 312 and second slot 321. Raised portion 332 is appropriately movable in first slot 312 and second slot 321. When user exerts an external force F1 on the driving portion 331 of the adjustment unit 33, the raised portion 332 is suitably moved to a first end, a, of the second slot 321. Put another way, when a first end portion of the first slot 312, which is in the same direction of the external force F1, coincides with a first end of the second slot 321, the connecting device 31 is at a first location with projections 311 and 313 extending out of the housing 32 by a first length, d1.

Figure 5:
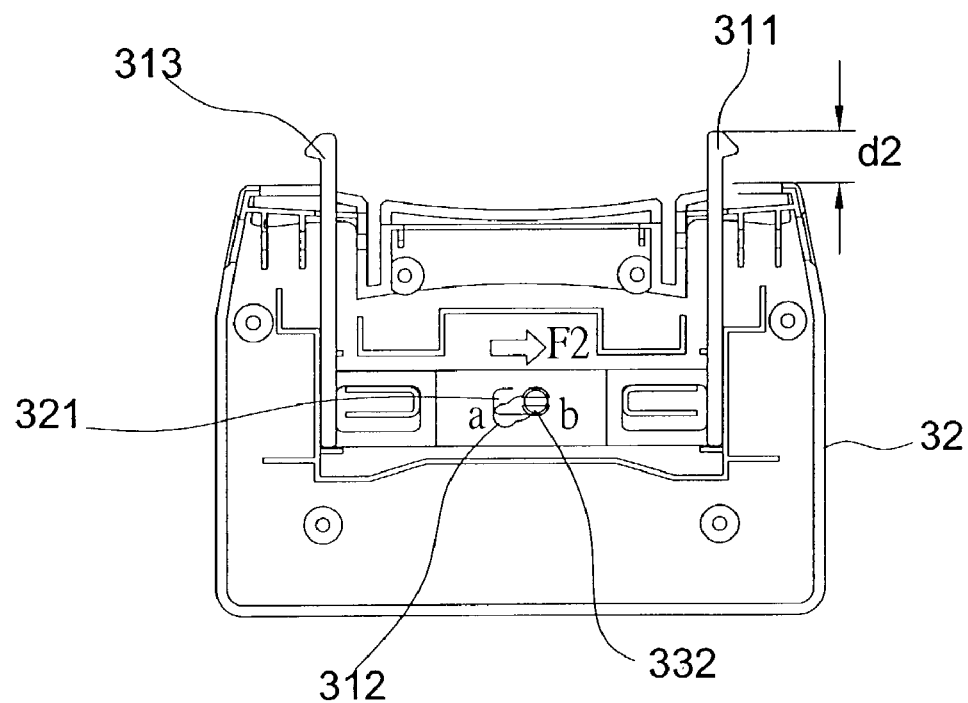
FIG. 5 illustrates a schematic view of an exemplary connecting device when the adjustment unit is at the second end.
Figure 5:
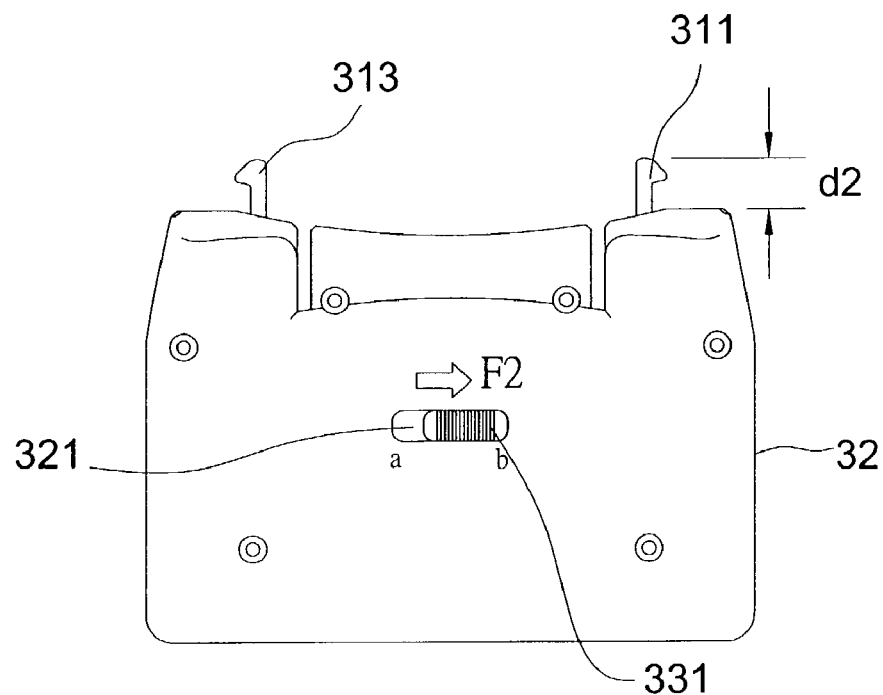

Referring now to FIG. 5, raised portion 332 of adjustment unit 33 may be pivotally connected to connecting device 31 by passing through second slot 321 and first slot 312 such that an angle is formed between the extending directions of first slot 312 and second slot 321. Raised portion 332 is suitably movable in first slot 312 and second slot 321. When user exerts an external force F2 on driving portion 331 of adjustment unit 33, raised portion 332 is moved to a second end, b, of second slot 321. That is, when a second end portion of first slot 312, which is in the same direction of the external force F2, coincides with a second end of second slot 321, connecting device 31 is at a second location with projections 311 and 313 extending out of housing 32 by a second length, d2.

Referring to FIGS. 4 and 5, raised portion 332 may be restricted to horizontal movements in second slot 321. Due to the restriction against movement of raised portion 332 and the angle between first slot 312 and second slot 321, when adjustment unit 33 moves from the first end, a, (see FIG. 4) to the second end, b, (see FIG. 5), connecting device 31 moves downward such that the projection length extending out of housing 32 is changed from the first length, d1, to the second length, d2. Similarly, when adjustment unit 33 moves from the second end, b, (see FIG. 5) to the first end, a, (see FIG. 4), connecting device 31 moves upward such that the projection length extending out of housing 32 is changed from the second length, d2, to the first length, d1.

As shown in FIGS. 4 and 5, when adjustment unit 33 is at the first end, a, projections 311 and 313 extend out of housing 32 by the first length, d1. When adjustment unit 33 is at the second end, b, projections 311 and 313 extend out of housing 32 by the second length, d2. The first length, d1, is longer than the second length, d2. By changing the location of the adjustment unit 33, the projection length extending out of the housing 32 is therefore adjusted such that the keyboard 3 or other input device is capable of connecting to various devices 2 of varying depths of receiving portions.

Although specific embodiments have been illustrated and described, various modifications may be made without departing from the scope of the invention, which is intended to be limited solely by the appended claims and their legal equivalents. As an example of a modification that could be made to the exemplary embodiment shown in FIGS. 2–3, for example, projections 311 and 313 could be designed to extend out of the housing 32 by more than two different lengths. That is, first slot 312 could be designed with an inner rim of multi-curve phase such that projections 311 and 313 extend out of housing 32 by different lengths to selectively connect keyboard 3 to various devices 3 with varying receiving portions. The term "substantially" as used herein is intended to compensate for minor design imperfections and other variations in design that will not ordinarily deviate from the values set forth herein by more than about 10%.

The invention claimed is:

1. A portable electronic apparatus, comprising:
   a data processing device; and
   a data input device;
   said data input device having:
   a housing comprising a second slot having a first end and a second end;
   a connecting device having a projection and a first slot, said connecting device movably, along a longitudinal axis of said projection, connected to said housing; and
   an adjustment unit, disposed on said housing, movable between said first end and said second end, and pivotally connected to said second slot by passing through said first slot,
   wherein when said adjustment unit moves to said first end so as to affix said connecting device on a first location, said projection extends out of said housing by a first length; and when said adjustment unit moves to said second end so as to affix said connecting device on a second location, said projection extends out of said housing by a second length different from said first length, and wherein said projection is configured to detachably connect said data input device to said data processing device selectively with said first length and said second length.

2. The portable electronic apparatus according to claim 1, wherein when said adjustment unit moves to said first end, a portion of said first slot coincides with said first end of said second slot.

3. The portable electronic apparatus according to claim 1, wherein an angle is formed between extending directions of said second slot and said first slot.

4. The portable electronic apparatus according to claim 1, wherein said data processing device is a personal digital assistant (PDA).

5. The portable electronic apparatus according to claim 1, wherein said data input device is a keyboard.

6. A data input apparatus for detachably connecting to a data processing device, said data input apparatus comprising:
   a housing comprising a second slot having a first end and a second end;
   a connecting device having a projection and a first slot, said connecting device movably connected along a longitudinal axis of said projection to said housing; and
   an adjustment unit, disposed on said housing, movable between said first end and said second end, and pivotally connected to said second slot through said first slot,
   wherein when said adjustment unit moves to said first end so as to affix said connecting device on a first location, said projection extends out of said housing by a first length, and when said adjustment unit moves to said second end so as to affix said connecting device on a second location, said projection extends out of said housing by a second length different from said first length, and wherein said projection is configured to detachably connect said data input device to said data processing device selectively with said first length and said second length.

7. The data input apparatus according to claim 6, wherein a portion of said first slot coincides with said first end of said second slot when said adjustment unit moves to said first end.

8. The data input apparatus according to claim 6, wherein an angle is formed between extending directions of said second slot and said first slot.

9. The data input apparatus according to claim 6, wherein said data input apparatus is a keyboard.

* * * * *